Figure 5:
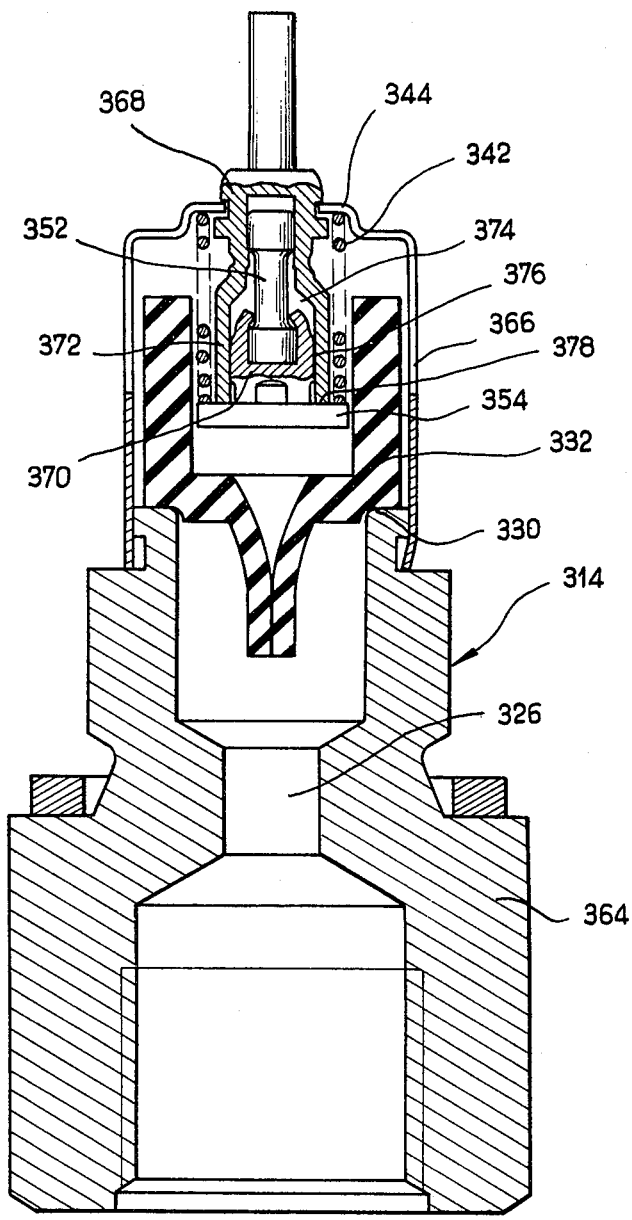

United States Patent [19]

Carré et al.

[11] Patent Number: 4,484,671

[45] Date of Patent: Nov. 27, 1984

[54] PRESSURE GENERATOR UNIT FOR HYDRAULIC BRAKING SYSTEM

[75] Inventors: Jean-Jacques Carré, Le Raincy; Roland Levrai, Stains, both of France

[73] Assignee: Societe Anonyme DBA, Paris, France

[21] Appl. No.: 391,626

[22] Filed: Jun. 24, 1982

[30] Foreign Application Priority Data

Jul. 8, 1981 [FR] France ............................... 81 13385
Sep. 16, 1981 [FR] France ............................... 81 14478

[51] Int. Cl.$^3$ ............................................. B60T 17/00
[52] U.S. Cl. ..................................... 188/352; 137/797
[58] Field of Search .......................... 60/584; 137/797; 188/352; 251/85, 89; 303/6 R, 58, 68, 86

[56] References Cited

U.S. PATENT DOCUMENTS

| | | | |
|---|---|---|---|
| 2,046,228 | 6/1936 | Wiedmann et al. | 188/352 X |
| 3,155,110 | 11/1964 | Hoffman | 137/493.1 |
| 3,159,176 | 12/1964 | Russell et al. | 137/493.1 |
| 3,855,798 | 12/1974 | Spairani | 60/585 |

FOREIGN PATENT DOCUMENTS

| | | |
|---|---|---|
| 1220273 | 12/1966 | Fed. Rep. of Germany . |
| 2447305 | 10/1980 | France . |
| 235420 | 9/1945 | Switzerland . |

*Primary Examiner*—Duane A. Reger
*Attorney, Agent, or Firm*—Larry J. Palguta; Paul D. Schoenle; Ken C. Decker

[57] ABSTRACT

The generator unit is of the type including a valve (14,114,214,314) for maintaining a residual pressure. The valve (14,114,214,314) comprises a closure element (32,132,232,332) urged by a spring (42,142,242,342) towards a seat (30,130,230,330). According to the invention, it also includes a temporary retaining member (50,152,252,352) holding off the force of the spring and responsive to at least the presence of brake fluid to release the spring (42,142,242,342). The invention and application may be utilized in hydraulic braking systems for motor vehicles.

16 Claims, 5 Drawing Figures

U.S. Patent  Nov. 27, 1984  4,484,671
FIG_1
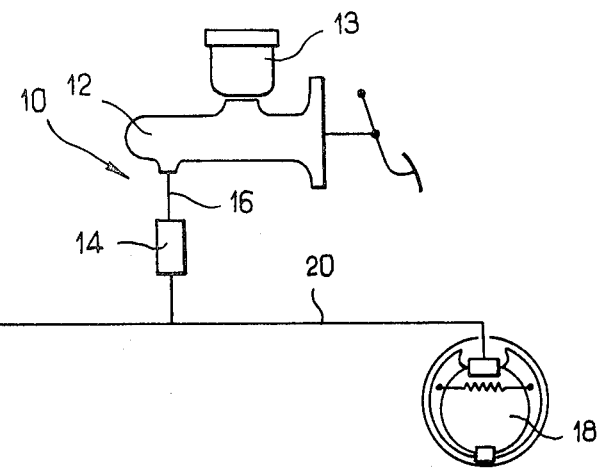
FIG_2
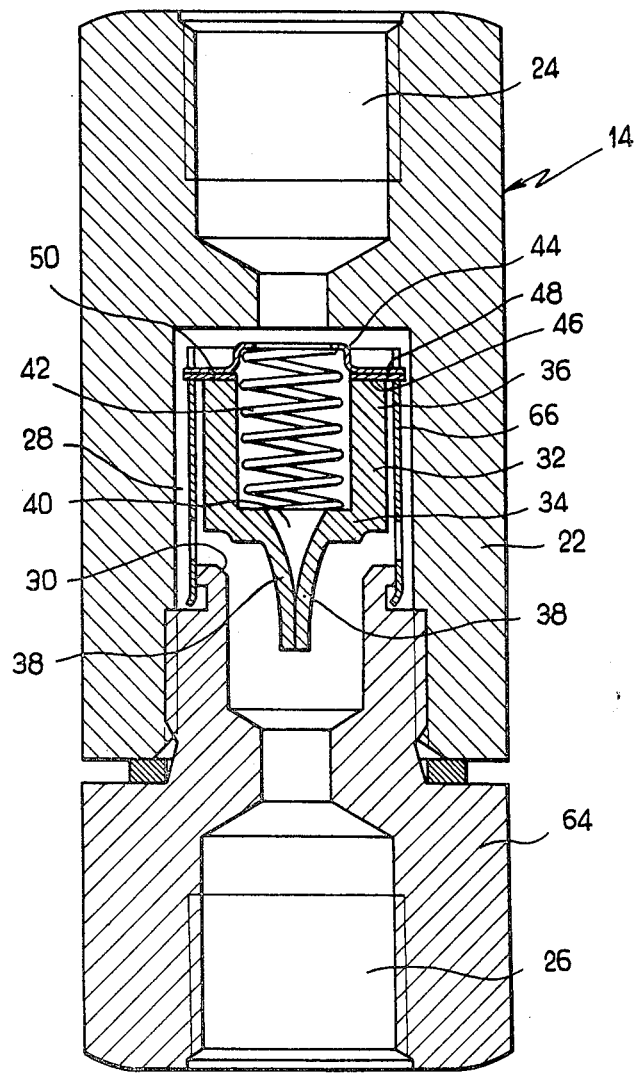

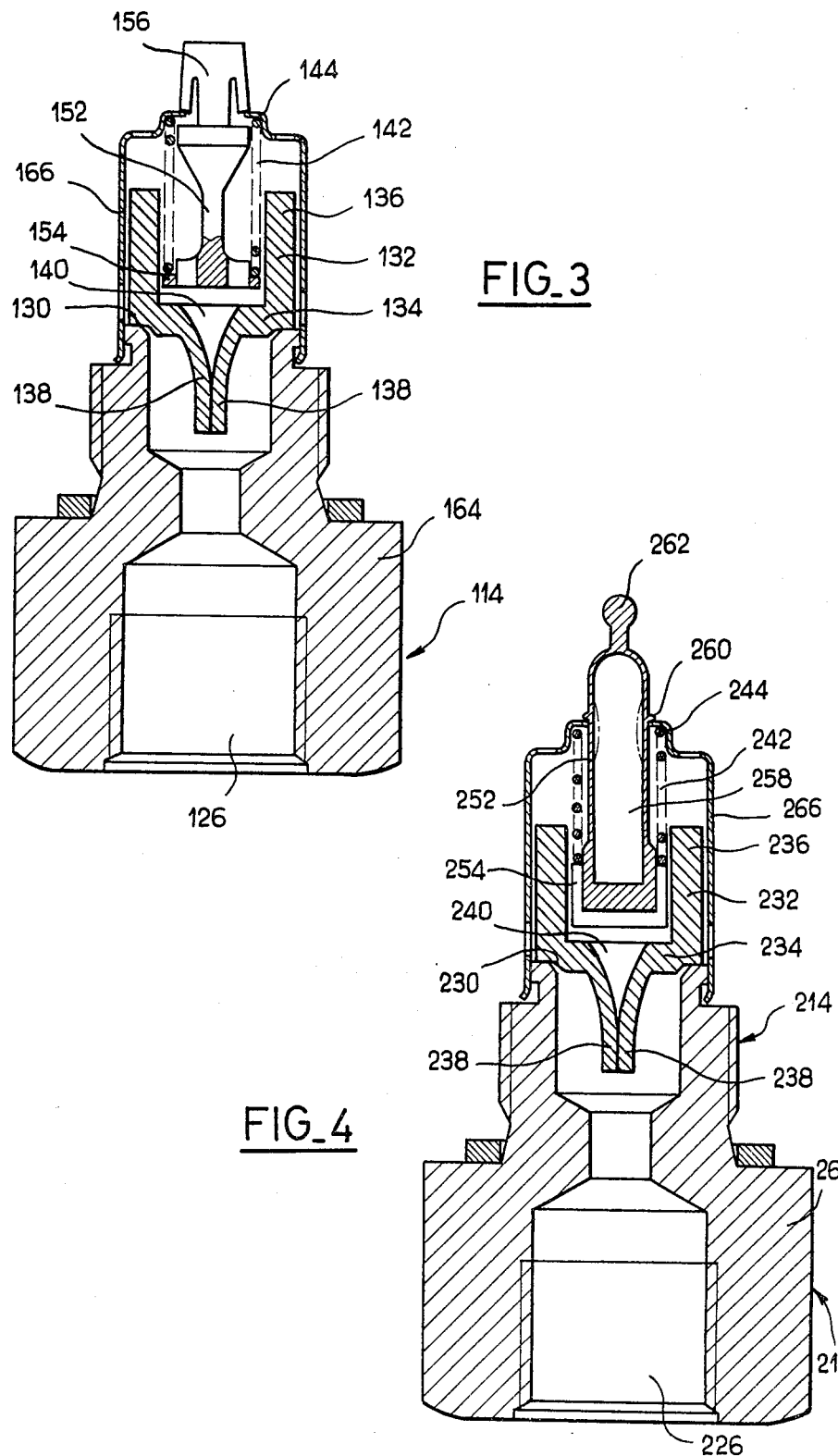

PRESSURE GENERATOR UNIT FOR HYDRAULIC BRAKING SYSTEM

The invention relates to pressure generator units for the hydraulic braking system of a motor vehicle, of the type including valves for maintaining residual pressure.

In hydraulic braking systems, especially for vehicles equipped with drum brakes, a valve for maintaining residual pressure is currently provided, between the master-cylinder and the brake motors, whose function is to maintain a particular pressure in the brake motors, even in the absence of braking. This arrangement allows the intake of the braking circuit to be reduced and therefore also the stroke of the member for actuating the master-cylinder as well as the response time of the braking system. Such valves include a closure element located at the master-cylinder side and urged by calibrated resilient means towards a seat located at the brake motors' side.

A one-way valve ensures unrestricted passage of fluid from the master-cylinder towards the brakes. To make the unit as compact as possible, the one-way valve can be housed in the closure element itself.

A typical example of this type of valve is represented in patent FR No. 2 161 958. In this example, the closure element whose body is made of elastomeric material, includes a central opening and the one-way valve consists of a pair of touching lips formed integrally with the body of the closure element which extends in the direction of the brake motors, sealing the central openings. This type of valve is commonly termed a "duck bill lipped" valve.

Unfortunately these valves are not compatible with recent techniques for filling braking systems by preliminary evacuation.

In practice, before the evacuation, an operation which is generally carried out from the reservoir of the master-cylinder, the maintenance valve whose spring is calibrated to hold a pressure of some bars at the brakes makes evacuation of the air contained in the brakes and the conduits which serve them impossible.

To solve this problem, the invention proposes a pressure generator unit for an hydraulic braking system of a motor vehicle, comprising a pressure source and a valve for maintaining residual pressure inserted in a conduit connecting said source to at least one brake motor of said vehicle, said valve comprising a housing provided with an inlet orifice, in connection with said source, an outlet orifice to be connected to said motor, a chamber between said orifices and a valve seat located at the outlet orifice side, a closure element being mounted in said chamber opposite said seat and urged by resilient means towards the latter, characterized in that it includes temporary retaining means holding off the force of said resilient means, said temporary retaining means being responsive to at least the presence of brake fluid in said chamber to release said resilient means.

The invention will be described with reference to the attached figures:

FIG. 1 is a diagrammatic view of a braking system incorporating a pressure generator unit according to the invention, and FIGS. 2, 3, 4 and 5 are enlarged sectional views of four embodiments of valves incorporated in the braking system of FIG. 1.

The braking system 10 represented diagrammatically in FIG. 1 comprises a master-cylinder 12, or pressure source, a valve 14 for maintaining residual pressure, a first conduit 16 connecting the master-cylinder 12 and the valve 14, and at least one brake 18, a second conduit 20 connecting the valve 14 to the brake 18. In a conventional way, a brake fluid reservoir 13 is fixed to the master-cylinder 12.

A first embodiment of the valve 14 is represented in FIG. 2. This valve comprises a housing 22 provided with an inlet orifice 24 connected to the conduit 16 and an outlet orifice 26 connected to the conduit 20.

A chamber 28 is defined between these two orifices and a valve seat 30 is defined in the housing near the outlet orifice 26.

A closure element 32, made of elastomeric material, is housed in the chamber 28. It comprises a central part 34, substantially disc-shaped, intended to cooperate with the seat 30, an annular part 36 extending towards the inlet orifice 24 and a pair of touching lips, formed integrally with the central part 34, forming an edging to and closing an opening 40 of this central part. As represented, these lips 38 extend in the direction of the outlet orifice 26.

A one-way valve allowing unrestricted passage to the fluid from the inlet orifice 24 to the outlet orifice 26 is obtained in this way. A resilient element or spring 42 is inserted between a cup 44, fixed to the housing 22, and the central part 34 of the closure element 32 to urge the latter in the direction of the valve seat 30.

According to the invention, the closure element 32 is kept out of engagement with the seat 30 in the following way:

The end 46 of the annular part 36 of the closure element is secured by adhesive to a collar 48 also solid with the housing 22, near and beneath the cup 44. The adhesive 50 is specially chosen in accordance with the two following criteria: first, so as to be able to hold off the force of the spring 42, and second, so as to be dissolved by brake fluid used to fill the system 10.

Filling is carried out as follows: in a first stage, the braking system is connected to a vacuum pump (not represented), preferably by connecting the latter to the reservoir 13 associated with the master cylinder 12.

During this operation, the closure element 32 of the valve 14 stays out of engagement with its seat 30, thanks to the adhesive 50, and the air is evacuated from all the components of the system: master-cylinder 12, conduits 16 and 20, brakes 18 and chamber 28 of the valve 14.

In a second stage, the connection with the vacuum pump is cut off and then, in a third stage, the braking system is connected to a reserve of fluid (not represented). This system is thus totally filled with brake fluid by aspiration.

When these operations have been complete, the adhesive 50 is dissolved by the brake fluid and the spring 42 pushes the closure element 32 back into contact with its seat 30, the valve 14 being then able to carry out its function of holding a residual pressure in the conduit 20 and the brakes 18 between applications of the brakes.

It is established that the time necessary for dissolving the adhesive is not critical. In practice, some days elapse between filling of the braking system and delivery of the vehicle to its user. Tests have actually shown that dissolving of the adhesive is effective after 10 to 20 minutes.

It will be noted that adhesion of the closure element 32 to the collar 48 thus constitutes a temporary retaining means for restraining the spring 42.

FIG. 3 illustrates a variant valve in which elements identical to those of FIG. 2 bear the same reference numerals increased by the value 100.

In the case of this valve, a rod 152 includes a widened head 154, near the closure element 132, on which the spring 142 bears, and a tip 156 in ratchet engagement in the cup 144. The closure element 132 is thus free to disengage from the seat 130 so as to allow evacuation of the air contained in the conduit 20 and the brakes 18 when the system is put under vacuum. The material of the rod 152 is selected, at least partly, so as to dissolve in the brake fluid. Thus, when the system is filled with this liquid, the rod 152 breaks and the spring 142 is applied to the central part 134 of the closure element 132 and keeps this bearing on the seat 130.

FIG. 4 illustrates a second variant valve 214, in which elements identical to those of FIG. 3 bear the same reference numerals, increased by the value 100.

In the case of this valve, the rod 252 is made of plastics material and the interior of this rod is hollow to define an enclosed cavity 258 filled with any gas. At its periphery, the rod 252 has a ridge 260 kept in engagement with the cup 244 to restrain the spring 242.

After filling of the system, as already explained, the first application of the brakes, by operation of the master-cylinder 12, causes collapse of the enclosed cavity 258 of the rod 252. The ridge 260 is consequently deformed radially inwards and as the rod 252 has been released, the spring 242 applies the closure element 232 to the seat 230.

When sealing of the valve 214 is required to be tested before it is fitted on the vehicle, a tab 262 at the top of the rod 252 allows the rod to be pulled to bring the ridge away from the cup 244 and keep the spring 242 compressed. In the two other embodiments, sealing tests can also be made, on condition, naturally, that brake fluid is not used to carry out these tests. In the case of the apparatus of FIG. 3, after checking, the tip 156 is pulled until it comes into ratchet engagement in the cup 144. In the case of the apparatus of FIG. 2, a bayonet coupling is provided for the collar 48 and the cover 66.

FIG. 5 represents a third variant valve 314 in which elements identical to those of FIG. 4 bear the same reference numerals, increased by the value 100.

In this embodiment, the temporary retaining means for restraining the spring 342 are obtained as follows:

Two metal parts 368 and 370 are crimped to the two ends of a rod 352 made of a "reactive" material, this term meaning that the mechanical characteristics of the material are altered by contact with the brake fluid, as will be explained hereinafter.

The first metal part 368 is caught in the cap 344 and the second 370 includes a head 354 against which the spring bears.

Furthermore, the first metal part 368 includes a skirt 372 which extends about the second part 370, as far as contact with the head 354.

The rod 352 is thus enclosed within a cavity 374 which communicates with the exterior via passages 376 and 378 of small section, the first (376) being defined by longitudinal channels on the exterior of the second part 370 or the interior of the skirt 372 or by the provision of play between the skirt and the second part, and the second (378) being defined by radial grooves at the end of the skirt 372 or on the head 354.

The behavior of the apparatus when the braking system is filled is as follows:

During the evacuation phase, the cavity is also under vacuum via the passages 376 and 378; during the following phase, in which the braking system is put in communication with a brake fluid reserve, the cavity 374 fills and the brake fluid comes into contact with the rod 352 whose resistance becomes less than the force of the spring 342. The rod 352 breaks as a result and the spring 342 then applies the closure element 332 to its seating 330. In view of the usual composition of brake fluid, among the materials considered possible for the rod 352 are particularly that known by the name polysulfone or polymethacrylate-base materials.

The presence of the skirt 372 and passages of small section 376, 378 provides the following advantages:

(1) The rod 352 is protected against external agents during handling and storage of the preassembled elements.

(2) When the rod 352 breaks, there may be fragments from the breaking region; these fragments are then trapped in the cavity 374 and cannot enter the braking circuit.

(3) Sealing tests can be carried out on the valve before its installation by using the brake fluid itself. In practice, during these tests pressure is applied to the orifice 326, the metal part 368 of course being released with respect to the cap 344, and the brake fluid is able to come into contact with the parts 368 and 370, though the small section of the passages 376 and 378 prevents the brake fluid from entering the cavity 374. The rod 352 therefore remains undamaged (4) Filling of the installation must of course be carried out by previous evacuation. In practice, if conventional techniques are used of gravitational flow or flow under low pressure, the small section of the passages 376, 378 prevents evacuation of the air contained in the cavity 374 and filling of this with brake fluid, and as a result, breaking of the rod 352 does not occur on filling. It will be noted that this arrangement can be advantageously applied to the second embodiment described hereinabove (see FIG. 3)

Lastly, for convenience, the two elements 368 and 370 have been described as being made of metal. Clearly, in practice any "non-reactive" material, i.e. whose mechanical characteristics are not altered by contact with brake fluid, can be suitable for these elements.

For the four embodiments, it will be noted that the valve (14, 114, 214, 314) is mounted on an insert (64, 164, 264, 364) made as a fitting, which may be attached either to a housing (22, 122, 222, 322) as shown, or directly onto an outlet of the master cylinder (not shown). The cup (44, 144, 244, 344) is attached to the insert (64, 164, 264, 364) by means of a pierced sleeve (66, 166, 266, 366) crimped onto the insert.

We claim:

1. A pressure generator unit for the hydraulic braking system of a motor vehicle, including a pressure source, a valve for maintaining residual pressure and inserted in a conduit connecting said source to at least one brake motor of said vehicle, said valve comprising a housing provided with an inlet orifice in connection with said source, an outlet orifice to be connected to said motor, a chamber between said orifices and a valve seat located near said outlet orifice, a closure element being mounted in said chamber opposite said seat and for being urged by resilient means into sealing engagement with said seat, characterized in that the valve includes temporary retaining means holding off the force of said resilient means and preventing said sealing engagement, said temporary retaining means being responsive to at least the presence of brake fluid in said chamber to release irreversibly said resilient means which thereafter urges said closure means into sealing engagement with said valve seat.

2. The pressure generator unit according to claim 1, characterized in that said temporary retaining means includes an element fixedly mounted on said housing and with which said closure element is made solid by adhesion, the adhesive being soluble in brake fluid.

3. The pressure generator unit according to claim 1, characterized in that said temporary retaining means includes a rod, one end of which is fixed to said housing and the other end of which, located near said closure element, forms a widened head on which said resilient means bears, said rod being made, at least partly, of a material soluble in brake fluid.

4. The pressure generator unit according to claim 1, characterized in that said temporary retaining means includes a rod made of plastic material whose end located near said closure element forms a widened head on which said resilient means bears and whose other end includes a ridge bearing on said housing, an enclosed cavity filled with gas being defined inside said rod at said ridge, with the result that pressurizing of the brake fluid causes collapse of said rod at said cavity and disengagement of said ridge with respect to said housing.

5. The pressure generator unit according to claim 1, characterized in that said temporary retaining means comprises a rod, one end of which is fixed to said housing and the other end of which, located near said closure element, forms an enlarged head on which said resilient means bears, said rod being at least partially made of a reactive material whose mechanical characteristics are weakened by contact with brake fluid.

6. The pressure generator unit according to claim 5, characterized in that said reactive material is polysulfone.

7. The pressure generator unit according to claim 5, characterized in that said reactive material is polymethacrylate.

8. The pressure generator unit according to anyone of claims 3, 5, 6, and 7, characterized in that the rod made of reactive material or soluble material is enclosed within a cavity of an element and the cavity connected to said chamber via a passage of small section.

9. The pressure generator unit according to claim 8, characterized in that said rod is solid at its two ends with two elements, one of which is fixed to said housing and the other of which includes said head, one of said elements including a skirt extending in the direction of the other element, said cavity being defined inside said skirt and said passage of small section being defined between said skirt and said other element.

10. The pressure generator unit according to claim 1, characterized in that said pressure source consists of a master-cylinder and that said valve is mounted at an outlet tapping of said master-cylinder.

11. The pressure generator unit according to claim 1, characterized in that said valve housing is made of two parts: a first part in which said inlet orifice and said chamber are defined, and a second part in which said outlet orifice and said seat are defined, said closure element, resilient means, and temporary retaining means being mounted on said second part.

12. A valve for maintaining residual pressure of a pressure generator unit, comprising a housing provided with an inlet orifice to be connected to a source of pressurized brake fluid and an outlet orifice to be connected to at least one brake motor, a chamber between said orifices and a valve seat located near said outlet orifice, a closure element being mounted in said chamber opposite said seat and for being urged by resilient means into sealing engagement with said seat, characterized in that the valve includes temporary retaining means holding off the force of said resilient means, said temporary retaining means being responsive to at least the presence of brake fluid in said chamber to release irreversibly said resilient means which thereafter urges said closure means into sealing engagement with said valve seat.

13. The valve according to claim 12, characterized in that said temporary retaining means includes an element fixedly mounted on said housing and with which said closure element is made solid by adhesion, the adhesive being soluble in brake fluid.

14. The valve according to claim 12, characterized in that said temporary retaining means includes a rod, one end of which is fixed to said housing and the other end of which, located near said closure element, forms a widened head on which said resilient means bears, said rod being made, at least partly, of a material soluble in brake fluid.

15. The valve according to claim 12, characterized in that said temporary retaining means includes a rod made of plastic material, whose end located near said closure element forms a widened head on which said resilient means bears and whose other end includes a ridge bearing on said housing, an enclosed cavity filled with gas being defined inside said rod and at said ridge, with the result that pressurizing of the brake fluid causes collapse of said rod at said cavity and disengagement of said ridge with respect to said housing.

16. The valve according to claim 12, characterized in that said temporary retaining means includes a rod, one end of which is fixed to said housing and the other end of which, located near said closure element, forms an enlarged head on which said resilient means bears, said rod being, at least partially, made of a reactive material whose mechanical characteristics are weakened by contact with brake fluid.

* * * * *

UNITED STATES PATENT AND TRADEMARK OFFICE
CERTIFICATE OF CORRECTION

PATENT NO. : 4,484,671
DATED : NOVEMBER 27, 1984
INVENTOR(S) : JEAN-JACQUES CARRE and ROLAND LEVRAI It is certified that error appears in the above-identified patent and that said Letters Patent are hereby corrected as shown below:

Cover Page, line 10, heading [30], delete "81 14478" and insert ---81 17478---.

Signed and Sealed this

Sixteenth Day of July 1985

[SEAL]

Attest:

DONALD J. QUIGG

Attesting Officer

Acting Commissioner of Patents and Trademarks